US012595360B2

(12) United States Patent
Peng et al.

(10) Patent No.: US 12,595,360 B2
(45) Date of Patent: Apr. 7, 2026

(54) ROOFING COMPOSITIONS COMPRISING LINEAR LOW-DENSITY POLYETHYLENE

(71) Applicant: JOHNS MANVILLE, Denver, CO (US)

(72) Inventors: Lichih R Peng, Littleton, CO (US); Jordan Kortmeyer, Parker, CO (US); ChangQing Shen, Centennial, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 744 days.

(21) Appl. No.: 17/900,965

(22) Filed: Sep. 1, 2022

(65) Prior Publication Data

US 2023/0083883 A1 Mar. 16, 2023

Related U.S. Application Data

(60) Provisional application No. 63/242,712, filed on Sep. 10, 2021.

(51) Int. Cl.
*C08L 23/08* (2025.01)
*C08L 23/0807* (2025.01)

(52) U.S. Cl.
CPC ....... *C08L 23/0815* (2013.01); *C08L 2205/03* (2013.01)

(58) Field of Classification Search
CPC ...................................................... C08L 23/08
USPC .......................................................... 523/206
See application file for complete search history.

(56) References Cited

U.S. PATENT DOCUMENTS

| | | | | |
|---|---|---|---|---|
| 10,619,037 | B2 * | 4/2020 | Peng | ......................... E04D 5/06 |
| 10,647,839 | B2 * | 5/2020 | Peng | ...................... C08L 23/06 |
| 11,286,380 | B2 | 3/2022 | Peng et al. | |
| 11,578,197 | B2 * | 2/2023 | Peng | ..................... C08L 23/142 |

* cited by examiner

*Primary Examiner* — Deve V Hall
(74) *Attorney, Agent, or Firm* — Robert D. Touslee

(57) ABSTRACT

Provided is a polymer blend composition comprising linear low density polyethylene, a polypropylene polymer, generally comprising a random polypropylene copolymer, and a compatibilizer. In one embodiment, there is provided a polymer blend composition comprising 15 to 35 wt % of a polypropylene polymer, 30-60 wt % of a linear low density polyethylene, and a compatibilizer polymer composition comprising 21-50 wt % of the polymer blend. The polymer blend is quite useful in a roofing membrane.

28 Claims, 1 Drawing Sheet

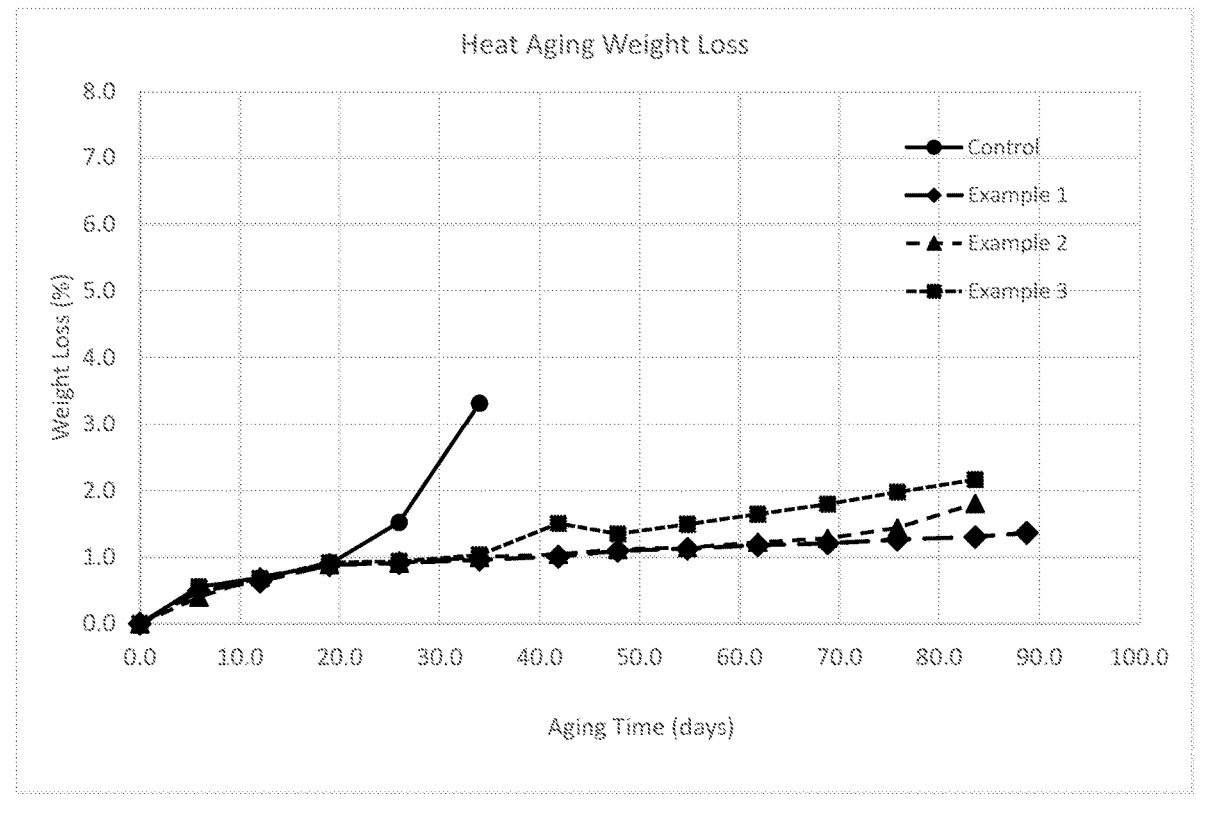

ROOFING COMPOSITIONS COMPRISING LINEAR LOW-DENSITY POLYETHYLENE

CROSS-REFERENCE TO RELATED APPLICATIONS

This application is a non-provisional application claiming benefit of U.S. provisional Application No. 63/242,712 filed Sep. 10, 2021.

FIELD OF THE INVENTION

Formulations are provided which are useful in roofing applications. Linear low density polyethylene is blended with thermoplastic olefin (TPO) polymers, which blend can be used to prepare a roofing membrane of enhanced properties.

BACKGROUND OF THE INVENTION

Compositions and membranes comprising thermoplastic olefin (TPO) polymers have found widespread use in the roofing industry for commercial buildings. For roofing and other sheeting applications, the products are typically manufactured as membrane sheets. The sheets are typically sold, transported, and stored in rolls. For roofing membrane applications, several sheets are unrolled at the installation site, placed adjacent to each other with an overlapping edge to cover the roof and are sealed together by a heat welding process during installation. During transport and storage, the rolls can be exposed to extreme heat conditions, such as from 40° C. to 100° C., which can lead to roll blocking of the rolls during storage in a warehouse. After installation, the membranes can be exposed during service to a wide range of conditions that may deteriorate or destroy the integrity of the membrane. As such, a membrane is desired that can withstand a wide variety of service temperatures, with a particular focus on thermal and UV stability.

Thermoplastic olefin roofing membranes require high flexibility together with good mechanical stability at elevated temperatures, and high weathering resistance. A number of proposals for thermoplastic olefin films of this type are disclosed in the following publications.

US 2006/0046084 describes a thermoplastic polyolefin roofing membrane produced from a mixture of a polypropylene-based elastomer (PBE) and polyolefin copolymers.

US 2010/0255739 describes a roofing membrane with a composition comprising a propylene-based elastomer.

US 2010/0197844 describes a thermoplastic olefin membrane for use in construction materials which comprises a polypropylene-based elastomer.

PCT Publication WO 2010/0115079A1 is directed to roofing membranes that contain compositions comprising a propylene based elastomer and an impact propylene-ethylene copolymer. The propylene based elastomer was Vistamaxx™ 6102.

PCT Publication WO 2014/001224AI is directed to compositions comprising 40 to 75 wt % of at least one polypropylene-based elastomer and around 25 to 60 wt % of at least one random copolymer of polypropylene. The polypropylene-based elastomers used in WO 2014/001224AI were Vistamaxx™ 3980, 6102, and 6202.

PCT Publication WO 2014/040914AI is directed to thermoplastic mixtures that comprise at least one impact-resistant polypropylene copolymer and at least one ethylene-1-octene copolymer, where the weight ratio of impact-resistant polypropylene copolymer to ethylene-1-octene copolymer is in the range of 35:65 to 65:35.

U.S. Patent Ser. No. 62/121,230, filed on Feb. 26, 2015, is directed to a roofing membrane composition of a 10-50 wt % of a propylene-based elastomer, 5-40 wt % of a thermoplastic resin, at least one flame retardant, and at least one ultraviolet stabilizer.

U.S. Pat. No. 9,434,827 discloses a composition which is useful in roofing membranes that comprises on a polymer basis, from 40 to 75% by weight of at least one propylene based elastomer; and 25 to 60% by weight of at least one random polypropylene copolymer.

US 2021/0024733 describes a polymer blend that includes 35 to 50 wt % of at least one propylene-based elastomer, 25 to 50 wt % of at least one impact polymer and 15 to 25 wt % of at least one low density polyethylene component. The polymer blend is useful for making a roofing membrane.

U.S. Pat. Nos. 10,619,037 and 10,647,839 both describe membrane compositions based on particular polymer blends. The polymer blends comprise from 30-60 wt % of a linear low density polyethylene and from 20-65 wt % of a propylene polymer having from 10-60% crystallinity with rubber dispersed therein. From 5-20 wt % of the polymer blend is a combination of two compatibilizers. One is a polypropylene matrix copolymer and the other is a polyethylene matrix copolymer.

In traditional mixtures, an at least semicrystalline polyolefin material such as polyethylene or polypropylene, which provides the mechanical strength and resistance to temperature change, is mixed with a flexible blend component. This flexible blend component is miscible, or at least compatible, with the polyolefin. Flexible blend components used to date include, ethylene-propylene-diene rubber (EPDM), ethylene-n-alkene copolymers, and also polypropylene-based elastomers. At present, the most common TPO polymer used in roofing membranes is Hifax™ CA10A, which is a polypropylene random copolymer matrix with EP rubber well dispersed throughout the polypropylene phase. This TPO formulation relies on in-reactor blend resin that has only a minor polypropylene copolymer as the matrix phase and the EP rubber as the majority phase, which is well dispersed in the polypropylene. The rubber phase is so fine and uniformly distributed that it cannot be made by any conventional mechanical mixing. However, improvements, cost efficiency and reproducibility are still needed.

There still remains a need for roofing membranes that demonstrate flexibility at service temperatures, particularly elevated temperatures. There is also a need for more economical roofing membranes which can meet such elevated temperature requirements.

SUMMARY OF THE INVENTION

A polymer blend composition comprising from 15 to 35 wt % of a thermoplastic polypropylene polymer from 30 to 60 wt % of a linear low density polyethylene, and from 21-50 wt % of a compatibilizer polymer composition, has been found to provide an economical roofing membrane which meets the elevated temperature requirements now demanded in the industry. In one embodiment, the polymer blend composition comprises 20-30 wt % of the polypropylene polymer, 35-50 wt % of the linear low density polyethylene, and 30 to 40 wt % of the compatibilizer polymer composition.

In one embodiment, the linear low density polyethylene comprises a butene comonomer.

In one embodiment, the polypropylene polymer comprises a random polypropylene copolymer.

The foregoing polymer blends comprising a linear low density polyethylene are useful in preparing a roofing membrane. The roofing membrane would be prepared from a membrane composition comprising the present polymer blend in an amount ranging from 40 to 70 wt % of the composition, and will generally include additives, e.g., at least one flame retardant, at least one ultraviolet stabilizer and at least one pigment.

Among other factors, it has been surprisingly discovered that combining linear low density polyethylene with a polypropylene polymer, with a package of compatibilizers, an economical TPO membrane with improved UV stability can be obtained. This is particularly achieved using the present polymer blends, and this is achieved without modifying or changing the stabilizer package. Adding the larger amounts of linear low density polyethylene to the formulation has also been discovered to provide some processing advantages.

BRIEF DESCRIPTION OF THE FIGURE OF THE DRAWING

The FIGURE of the Drawing graphically depicts the weight loss of sample membranes over time.

DETAILED DESCRIPTION

As the fastest growing commercial roofing membrane, TPO has become the dominate single ply membrane that provides both good weathering performance and lower cost. For the past decades, a TPO formulation heavily relies on an in-reactor blend resin that has minor polypropylene copolymer as the matrix phase and EP rubber as the majority phase well dispersed in the polypropylene. The rubber phase is so fine and uniformly distributed that it cannot be made by any conventional mechanical mixing. Due to this unique morphology, it gives good mechanical properties yet maintains its flexibility that is preferred by the roofers for installation convenience.

However, recent developmental work in polyolefin formulation found that good mechanical properties including good flexibility can be achieved through a unique blend of polyolefin resins, which blend is also more economical. These blends not only can achieve good mechanical performance but also excellent weathering performance as tested by high temperature heat aging.

The resin blend comprises linear low density polyethylene (LLDPE). The LLDPE with butene as its comonomer is particularly preferred. In addition, a polypropylene based polymer/copolymer is included, the polypropylene base polymer/copolymer provides mechanical strength and high temperature resistance, such as a random polypropylene copolymer. This polypropylene polymer replaces the in-reactor resin having EP rubber as a majority phase that is now typically used in roofing membranes.

A compatibilizer is also used to insure a blend that is stable under high temperature and long term aging. The compatibilizer could be a polyethylene based copolymer, a polypropylene based copolymer, or a styrene/butadiene (SBS); styrene-ethylene/propylene-styrene (SEPS); and styrene-ethylene/butylene-styrene (SEBS) based copolymer. For polyethylene and polypropylene based compatibilizer components, the metallocene made polypropylene and polyethylene copolymer elastomers are preferred. For example, there are two types of random copolymers made by metallocene technology: polypropylene and polyethylene elastomers. The common grades in the market are Engage (available from Dow) or Exact (available from Exxon) for the polyethylene matrix copolymer and Versify (Dow) and Vistamaxx (Exxon) for the polypropylene matrix copolymer. Polyethylene and polypropylene based block copolymers, such as Infuse™ and Intune™ from Dow, can be used as well. Moreover, styrene block copolymers from Kraton Corp. of Houston, Tex. can be used in the compatibilizer, including SBS, SEPS, SEBS types of block copolymers.

The present polymer blend provides an economical polymer blend that is useful in roofing membranes that exhibits excellent high temperature thermal stability as well as reduced tackiness. These advantages are unprecedented and offer the industry a solution to its quest for a more economical yet a better performing roofing membrane. These advantages have been discovered by combining linear low density polyethylene with the more traditional thermoplastic polyolefin polymers. The linear low density polyethylene substitutes for some of the polyolefin polymers used in conventional roofing membrane polymer blends in a manner still allowing for phase stability. Maintaining phase stability is important, otherwise the physical properties and stability of the finished article are adversely affected. To the contrary, the right balance of linear low density polyethylene has been found to insure phase stability, without changing or modifying the stabilizer package, while also providing a final product of excellent performance. The excellent performance is particularly evident in thermal stability, and maintaining that thermal stability over time.

In general, the present polymer blend comprises three components. Linear low density polyethylene (LLDPE) is one component.

Liner low density polyethylene (LLDPE) is well known in the polymer industry and is readily available commercially. Linear low-density polyethylene is a substantially linear polymer (polyethylene), with significant numbers of short branches, commonly made by copolymerization of ethylene with longer-chain olefins. Linear low-density polyethylene differs structurally from conventional low-density polyethylene (LDPE) because of the absence of long chain branching. The linearity of LLDPE results from the different manufacturing processes of LLDPE and LDPE. In general, LLDPE is produced at lower temperatures and pressures by copolymerization of ethylene and such higher alpha-olefins as butene, hexene, or octene. The copolymerization process produces an LLDPE polymer that has a narrower molecular weight distribution than conventional LDPE and in combination with the linear structure, significantly different rheological properties.

The production of LLDPE is initiated by transition metal catalysts, particularly Ziegler or Philips type of catalyst. The actual polymerization process can be done either in solution phase or in gas phase reactors. Usually, octene is the comonomer in solution phase while butene and hexene are copolymerized with ethylene in a gas phase reactor. LLDPE has higher tensile strength and higher impact and puncture resistance than does LDPE. It is very flexible and elongates under stress. It can be used to make thinner films, with better environmental stress cracking resistance. It has good resistance to chemicals. It has good electrical properties.

In one embodiment, provided is a polymer blend composition comprising linear low density polyethylene, a TPO polymer, i.e., a propylene polymer (preferably having no rubber dispersed therein), and a combination of compatibilizers comprising a polypropylene (PP) matrix or backbone copolymer and a polyethylene (PE) matrix or backbone copolymer.

LLDPE is commercially available from chemical companies such as Exxon Mobil Corporation, The Dow Chemical Company, LyondellBasel Industries N.V., Saudi Basic Industries Corporation (SABIC), Borealis AG, Formosa Plastics Corporation, U.S.A. (Formosa Plastics), China Petroleum & Chemical Corporation (Sinopec Corporation), INEOS Group AG, Chevron Phillips Chemical Company LLC, NOVA Chemicals Corporation, Sasol Limited, and Braskem S.A.

While LLDPE is prepared by copolymerization of ethylene and alpha-olefins, for example, butene, hexene, or octene, for the purposes of the present compositions it is most preferred that butene is the comonomer. It has been discovered that the best performance and processing characteristics are achieved when the LLDPE is prepared with butene as the comonomer.

Examples of suitable LLDPE resins, with butene comonomer, include Dow™ DFDA-7047 NT7, available from Dow Chemical Company of Midland, Mich.; Chevron Philips 6109CL can also be used successfully. In general, the LLDPE has a density of 0.910 to 0.925 g/cm³, in another embodiment 0.915 to 0.920 g/cm³, and in another embodiment, from 0.916 to 0.918 g/cm³.

The amount of LLDPE used in the present polymer blend composition ranges from 30-60 wt %, and in another embodiment from 35-50 wt %, based on the weight of the polymer blend. In another embodiment, the amount ranges from 35 to 45 wt %, based on the total weight of the polymer blend.

The second component is a thermoplastic polypropylene. Such resin components are well known. The thermoplastic polypropylene component can be a random copolymer, an impact copolymer, or homopolymer. The random polypropylene copolymer generally contains less than 10 mol % ethylene monomer and is preferred. The random polypropylene copolymer can comprise, for example, from 1 mol % to less than 10 mol % ethylene monomer.

Such polymers are well known. For example, polypropylene polymers are commercially available from Total Atofina. One such polymer is the random polypropylene polymer Total 7238. Others can be used. Another commercial polypropylene polymer is available from ExxonMobil Chemical Company under the tradename ExxonMobile™ PP. One specific product is ExxonMobil™ PP7032. Another suitable TPO for roofing membranes is Ineos T00G-00, available from Ineos Olefins and Polymers, U.S.A.

The amount of the thermoplastic polypropylene polymer component in the polymer blend can generally range from 15 to 35 wt %, and in another embodiment from 20-30 wt %, based on the weight of the blend. The polypropylene polymer component generally has a density that ranges from 0.87 to 0.92 g/cm³, with a density in the range of from 0.88 to 0.91 in one embodiment. The melt flow rate of the propylene polymer component is generally in the range of from 0.5 to 20 g/10min, and in one embodiment the melt flow ranges from 0.5 to 5.0 g/10min. A melt flow rate in the range of from 0.6 to 4.0 g/10min is exhibited in one embodiment.

The third component is a compatibilizer polymer composition. This third component is generally used as a compatibilizer in the blend to aid in maintaining the blend and maintaining phase stability. The compatibilizer composition can comprise a polyethylene based copolymer, an elastomeric polypropylene based copolymer, and a SBS, SEPS, SEBS based copolymer. A mixture of the foregoing polymers, copolymers thereof or block copolymers thereof can be used in the compatibilizer composition. Or, the compatibilizer polymer composition can comprise but a single polymer or copolymer.

Suitable elastomer propylene copolymers that can be used in the compatibilizer composition are commercially available, and include Vistamaxx™ copolymers from ExxonMobil Chemical Company. For example, Vistamaxx™ 6102 or 6202 may be used. Versify copolymers available from Dow Chemical can also be successfully used. The polypropylene copolymer generally has a density from 0.860 to 0.900 g/cm³ and a melt flow rate of 1-25 g/10 min.

Suitable ethylene copolymers that can be used in the compatibilizer composition are commercially available, and include Engage™, available from Dow Chemical. Another copolymer is the ethylene alpha olefin copolymer Exact™, available from ExxonMobil Chemical. In general, the ethylene copolymer has a density in the range of from 0.860 to 0.915 g/cm³, and a melt flow rate in the range of about 0.5 to 5.0 g/10 min.

Polyethylene and polypropylene based block copolymers such as Infuse™ and Inture™ available from Dow Chemical can be used in the compatibilizer polymer composition, as well as styrene block copolymers from Kraton Corp. In one embodiment, the styrene block copolymer can be Kraton G-1657m, which is a styrene-ethylene/butylene-styrene (SEBS) tri-block copolymer. Besides a SEBS styrene block copolymer, styrene/butadiene (SBS) and styrene-ethylene/propylene-styrene (SEPS) block copolymers can also be used, and are available from Kraton Corp.

In one embodiment, the compatibilizer polymer composition comprises a polypropylene copolymer and a polyethylene copolymer. In one embodiment, a polypropylene copolymer such as Vistamaxx 6102 can be used alone as the compatibilizer polymer composition, or combined with a styrene block copolymer, such as Kraton G-1657m (SEBS), or the Vistamaxx combined with an ethylene olefin block copolymer such as Infuse 9107. Any combination of the foregoing polymers can be used in creating the compatibilizer polymer composition, as long as it acts suitably to maintain phase stability in the overall blend.

The compatibilizer combination of copolymers is generally present in the polymer blend composition in an amount ranging from 21 to 50 wt %, based on the weight of the polymer blend, or in one embodiment from 25 to 50 wt %, based on the total weight of the blend. In one embodiment, the amount ranges from 30 to 40 wt %. The relative ratio of the copolymer compatibilizers used depends on the desired viscosity or flow properties of the blend. In general, a single polymer can be used, but it is preferred to use a mixture of differing polymers, such as a polypropylene based copolymer with a polyethylene based copolymer, or a styrene block copolymer.

The present blend of polymers can be prepared by physically blending the different components. The blend is therefore a combination of polymer components that have already been formed and recovered before mixing or otherwise combined. The blending can also occur somewhat in solutions, miscible carriers, or by melt blending. The resulting blend is a multiphase polymer composition.

The balance of components in the blend is important because polypropylene and polyethylene will not maintain phase stability if the mix is not balanced. Instead, regions of polypropylene and polyethylene will form, which will affect the physical properties and stability of the finished article adversely. However, by maintaining the components in the range, for example, of from 30 to 60 wt % LLDPE; 15 to 35 wt % of the polypropylene component and 21 to 50 wt % of the compatibilizer composition, a polymer blend including LLDPE is obtained which maintains phase stability and provides even improved heat stability. Cost efficiency is also realized by the present blend, while still achieving improved performance characteristics.

Once the polymer blend has been achieved, and often pelletized, the blend can be used to prepare a membrane for use in a roof. Generally, a membrane composition is prepared where certain additives and fillers are added to the polymer blend. In one embodiment, at least one flame retardant, at least one ultraviolet stabilizer and at least one pigment is added to the polymer blend. This prepares a membrane composition comprising from 40-85 wt % of the polymer blend, based on the weight of the entire membrane composition, with the remaining components comprising at least one flame retardant, an ultraviolet stabilizer and pigment. In one embodiment, a membrane composition comprising from 40-70 wt % polymer blend, based on the weight of the entire membrane composition, is prepared. The flame retardant can be present, in one embodiment, in an amount ranging from 20 to 45 wt %. The pigment can be present in an amount of 3-6 wt %, and in one embodiment, in an amount of about 5 wt %. The pigment often used is $TiO_2$. In one embodiment, UV stabilizer can be present in the membrane composition in an amount ranging from about 3 to 7 wt %, and in one embodiment, in an amount of about 5 wt % of the membrane composition.

As noted above, the compositions described herein can also incorporate a variety of additives. The additives may include reinforcing and non-reinforcing fillers, antioxidants, stabilizers, processing oils, compatibilizing agents, lubricants (e.g., oleamide), antiblocking agents, antistatic agents, waxes, coupling agents for the fillers and/or pigment, pigments, flame retardants, antioxidants, and other processing aids known to the art. In some embodiments, the additives may comprise up to about 60 wt %, or up to about 55 wt %, or up to about 50 wt % of the roofing membrane composition. In some embodiments, the additives may comprise at least 25 wt %, or at least 30 wt %, or at least 35 wt %, or at least 40 wt % of the roofing membrane composition.

In some embodiments, the roofing membrane composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the roofing composition may include flame retardants, such as calcium carbonate, inorganic clays containing water of hydration such as aluminum trihydroxides ("ATH") or magnesium hydroxide. For example, the calcium carbonate or magnesium hydroxide may be pre-blended into a masterbatch with a thermoplastic resin, such as polypropylene, or a polypropylene/polyethylene copolymer. For example, the flame retardant may be pre-blended with a polypropylene, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch may then form at least 5 wt %, or at least 10 wt %, or at least 15 wt %, or at least 20 wt %, or at least 25 wt %, of the roofing composition. In some embodiments, the roofing composition comprises from 5 wt % to 40 wt %, or from 10 wt % to 35 wt %, or from 15 wt % to 30 wt % flame retardant masterbatch, where desirable ranges may include ranges from any lower limit to any upper limit.

The presence of calcium carbonate together with the large amount of LLDPE has been found to be of particular advantage when the amount of calcium carbonate in the membrane composition is at least 25 wt %. In one embodiment, the amount of calcium carbonate is at least 27 wt % of the membrane composition.

In some embodiments, the roofing membrane composition may include UV stabilizers, such as titanium dioxide or Tinuvin® XT-850. The UV stabilizers may be introduced into the roofing membrane composition as part of a masterbatch. For example, UV stabilizer may be pre-blended into a masterbatch with a thermoplastic resin, such as polypropylene. For example, the UV stabilizer may be pre-blended with a polypropylene or an impact polypropylene-ethylene copolymer, where the masterbatch comprises at least 5 wt %, or at least 7 wt %, or at least 10 wt %, or at least 12 wt %, or at least 15 wt %, of UV stabilizer, based on the weight of the masterbatch. The UV stabilizer masterbatch may then form at least 5 wt %, or at least 7 wt %, or at least 10 wt %, or at least 15 wt %, of the roofing membrane composition. In some embodiments, the roofing composition comprises from 5 wt % to 30 wt %, or from 7 wt % to 25 wt %, or from 10 wt % to 20 wt % UV stabilizer masterbatch, where desirable ranges may include ranges from any lower limit to any upper limit.

Still other additives may include antioxidant and/or thermal stabilizers. In an exemplary embodiment, processing and/or field thermal stabilizers may include IRGANOX® B-225 and/or IRGANOX® 1010 available from BASF.

The compositions described herein are particularly useful for roofing applications, such as for thermoplastic polyolefin roofing membranes. Membranes produced from the compositions may exhibit a beneficial combination of properties, and in particular exhibit an improved balance of flexibility at temperatures across a wide range, along with enhanced heat aging/UV stability properties. The roofing compositions described herein may be made either by pre-compounding or by in-situ compounding using polymer-manufacturing processes such as Banbury mixing or twin screw extrusion. The compositions may then be formed into roofing membranes. The roofing membranes may be particularly useful in commercial roofing applications, such as on flat, low-sloped, or steep-sloped substrates.

The roofing membranes may be fixed over the base roofing by any means known in the art such as via adhesive material, ballasted material, spot bonding, or mechanical spot fastening. For example, the membranes may be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane may also be fully adhered or self-adhered to an insulation or deck material using an adhesive. Insulation is typically secured to the deck with mechanical fasteners and the flexible membrane is adhered to the insulation.

In one embodiment, the roofing membrane can comprise more than one layer. For example, the membrane can comprise a cap or top layer, and a core or lower layer. While the polymer composition of each of the layers is essentially the same, the additives may vary. The cap layer is directed to UV protection and therefore may contain a greater UV stabilizer concentration than the core layer. The core layer can be designed for more heat protection, and therefore contain more antioxidants than the cap layer. Each layer provides a separate focused function based on the additives present, but with the polymer composition being within that of the present blend so that the benefits of the present blend as described above can be realized.

The following Examples are provided to further illustrate certain embodiments but the Examples are not intended to be limiting.

EXAMPLES

Several examples for in-reactor grade polypropylene free TPO blends are shown below in Table 1.

TABLE 1

| TPO Membrane formulation with free in-reactor grade polypropylene resin | | | | |
|---|---|---|---|---|
| | Control | Example 1 | Example 2 | Example 3 |
| Equistar CA10A | 63.5 | | | |
| Dow DFDA 7047 | | 28 | 24 | 30 |
| Vistamaxx 6102 | | 10 | 24.5 | 9.5 |
| Infuse 9107 | | | | 9 |
| Total r-PP 7238 | | 15 | 15 | 15 |
| Kraton G-1657M | | 10.5 | | |
| Calcium Carbonate | 27 | 27 | 27 | 27 |
| White Concentrate | 4.5 | 4.5 | 4.5 | 4.5 |
| UV Stabilizer | 5 | 5 | 5 | 5 |
| Total | 100 | 100 | 100 | 100 |
| Tensile Strength (psi) | 2294 | 1713 | 1669 | 1877 |
| Elongation (%) | 699 | 544 | 646 | 645 |
| Tensile Strength (psi) After 3-week-aging | 683 | 1079 | 1006 | 1185 |
| Elongation (%) After 3-week-aging | 6 | 49 | 486 | 100 |

The control formulation and the three formulations of Examples 1-3 in Table 1 were subjected to a heat aging test. The heat aging test method is specified in ASTM D573. Sheet specimens were cut to a size of 5 by 15 cm [2 by 6 in.] and three specimens were required. Specimens were aged at either 116° C. [240° F.] or 135° C. [275° F.]. Aged specimens were then allowed to cool to room temperature, re-weighed and weight loss expressed as the difference between the original weight and the aged weight, and then expressed as a percentage of the original weight to a precision of ±1.5%. The weight loss % results are shown graphically in the FIGURE.

As can be seen from the FIGURE, the 3 example formulations consistent with the present membrane compositions offer much improved heat aging results than the control, which comprises the typical TPO of in-reactor blend resin. All 3 of the example membrane formulations offer at least three times the protection.

While the foregoing is directed to embodiments of the present invention, other and further embodiments of the invention may be devised without departing from the basic scope thereof, and the scope thereof is determined by the claims that follow.

What is claimed is:

1. A polymer blend composition comprising:
   a) 15 to 35 wt % of a thermoplastic polypropylene polymer;
   b) 30 to 60 wt % of a linear low density polyethylene; and
   c) 21-50 wt % of a compatibilizer polymer composition.

2. The polymer blend composition of claim 1, wherein the polymer blend composition comprises:
   20 to 30 wt % of the propylene polymer a);

35 to 50 wt % of the linear low density polyethylene; and
   30 to 40 wt % of the compatibilizer polymer composition c).

3. The polymer blend composition of claim 1, wherein the compatibilizer polymer compositions of c) comprises a polypropylene matrix polymer.

4. The polymer blend composition of claim 3, wherein the compatibilizer polymer composition of c) comprises an elastomeric polypropylene matrix polymer and a polyethylene matrix polymer.

5. The polymer blend composition of claim 4, wherein the wt ratio of polypropylene matrix polymer to polyethylene matrix polymer ranges from 30:70 to 70:30.

6. The polymer blend composition of claim 1 or 3, wherein the compatibilizer polymer composition of c) comprises a styrenic block copolymer.

7. The polymer blend composition of claim 1, wherein the linear low density polyethylene comprises a butene comonomer, a hexene comonomer, or an octene comonomer.

8. The polymer blend composition of claim 7, wherein the linear low density polyethylene comprises a butene comonomer.

9. The polymer blend composition of claim 1, wherein the linear low density polyethylene has s density in the range of 0.915 to 0.920 g/cm$^3$.

10. The polymer blend composition of claim 1, wherein the propylene polymer a) has a density of 0.88 to 0.91 g/cm$^3$ and a melt flow rate of 0.5 to 5 g/10 min.

11. The polymer blend composition of claim 10, wherein the propylene polymer a) exhibits a melt flow rate of 0.6 to 4.0 g/10 min.

12. The polymer blend composition of claim 1, wherein the propylene polymer a) is free of rubber.

13. The polymer blend composition of claim 1, wherein component a) comprises a random polypropylene copolymer containing less than 10 mol % ethylene monomer.

14. A membrane composition comprising:
   a) from about 40 wt % to 70 wt % of a polymer blend composition comprising:
      (i) 15 to 35 wt % of a thermoplastic polypropylene polymer;
      (ii) 30 to 60 wt % of a linear low density polyethylene; and
      (iii) 21-50 wt % of a compatibilizer polymer composition;
   b) at least one flame retardant;
   c) at least one ultraviolet stabilizer; and
   d) at least one pigment.

15. The membrane composition of claim 14, wherein the flame retardant comprises 20 to 45 wt % of the composition.

16. The membrane composition of claim 14, wherein the pigment comprises from 3 to 6 wt % of the composition.

17. The membrane composition of claim 14, wherein the pigment comprises TiO2.

18. The membrane composition of claim 14, wherein the UV stabilizer comprises about 3 to 7 wt % of the composition.

19. The membrane composition of claim 18, wherein the UV stabilizer comprises about 5 wt % of the composition.

20. The membrane composition of claim 14, comprising calcium carbonate.

21. The membrane composition of claim 14, wherein the flame retardant comprises calcium carbonate.

22. The membrane composition of claim 21, wherein calcium carbonate comprises at least 25 wt % of the membrane composition.

23. The membrane composition of claim 22, wherein the amount of calcium carbonate comprises at least about 27 wt % of the membrane composition.

24. The membrane composition of claim 14, wherein the composition exhibits improved heat aging properties compared to a membrane composition comprising an in-reactor blend resin.

25. A roofing membrane comprising the membrane composition of claim 14.

26. A roof comprising the roofing membrane of claim 25.

27. A method of preparing a thermoplastic polyolefin film, the method comprising forming a thermoplastic polyolefin film from the composition of claim 14.

28. The membrane composition of claim 14, wherein the polymer blend composition of a) comprises:

20 to 30 wt % of the propylene polymer (i);

35 to 50 wt % of the linear low density polyethylene (ii); and 30 to 40 wt % of the compatibilizer polymer composition (iii).

* * * * *